US012810458B2

(12) United States Patent
Qiu et al.

(10) Patent No.: US 12,810,458 B2
(45) Date of Patent: Nov. 24, 2026

(54) METHOD, DEVICE AND NON-TRANSITORY COMPUTER-READABLE STORAGE MEDIUM FOR IDENTIFICATION OF PLATE DIMENSION

(71) Applicant: VEEGOO TECHNOLOGY CO., LTD., Foshan (CN)

(72) Inventors: Jianping Qiu, Foshan (CN); Daliao Chen, Foshan (CN); Jianqiang Zou, Foshan (CN)

(73) Assignee: VEEGOO TECHNOLOGY CO., LTD., Foshan (CN)

( * ) Notice: Subject to any disclaimer, the term of this patent is extended or adjusted under 35 U.S.C. 154(b) by 131 days.

(21) Appl. No.: 19/060,873

(22) Filed: Feb. 24, 2025

(65) Prior Publication Data

US 2025/0252592 A1 Aug. 7, 2025

Related U.S. Application Data

(63) Continuation of application No. PCT/CN2025/078087, filed on Feb. 19, 2025.

(30) Foreign Application Priority Data

Jan. 25, 2025 (CN) ........................ 202510120250.7

(51) Int. Cl.
*G06T 7/62* (2017.01)

(52) U.S. Cl.
CPC ..................................... *G06T 7/62* (2017.01)

(58) Field of Classification Search
CPC ................................... G06T 7/60; G06T 7/62
See application file for complete search history.

(56) References Cited

U.S. PATENT DOCUMENTS

2016/0363990 A1 12/2016 Key
2018/0285481 A1* 10/2018 Czmyrid ................ G06F 30/13
(Continued)

FOREIGN PATENT DOCUMENTS

CN 108240793 A 7/2018
CN 109839067 A 6/2019
JP 2010008352 A 1/2010

OTHER PUBLICATIONS

Min, Zhao, and Na Lihong. "Study on on-line measurement system of stone slabs based on OpenCV." 2010 International Conference on Computer and Information Application. IEEE, 2010. (Year: 2010).*
(Continued)

*Primary Examiner* — Geoffrey E Summers

(57) ABSTRACT

A plate dimension identification method is provided, where respectively under n predetermined shooting distances h, ratio R of length of a reference plate to an image pixel length, and ratio R' of width of the reference plate to an image pixel width are collected; each shooting distance is correlated with the corresponding R and R' to establish an identification model; a distance between a camara and a plate-carrying surface is measured and input into the model to output corresponding ratios R and R' ($R_{rough}$ and $R'_{rough}$); a target plate image is captured, from which pixel width and length are obtained; a rough width is calculated based on the pixel width and $R'_{rough}$, and a rough length is calculated based on the pixel length and $R_{rough}$; and accurate length and width of the target plate are obtained based on the rough width and length.

10 Claims, 5 Drawing Sheets

(56) References Cited

U.S. PATENT DOCUMENTS

2026/0099983 A1* 4/2026 Cardoso Machado ...................... G01B 11/2518
2026/0120307 A1* 4/2026 Feng ...................... G01G 21/22

OTHER PUBLICATIONS

Yang, Erbing, et al. "A method to improve the precision of 2-dimensioanl size measurement of objects through image processing." 2022 21st International Symposium on Distributed Computing and Applications for Business Engineering and Science (DCABES). IEEE, 2022. (Year: 2022).*

* cited by examiner

METHOD, DEVICE AND NON-TRANSITORY COMPUTER-READABLE STORAGE MEDIUM FOR IDENTIFICATION OF PLATE DIMENSION

CROSS-REFERENCE TO RELATED APPLICATIONS

This application is a continuation of International Patent Application No. PCT/CN2025/078087, filed on Feb. 19, 2025, which claims the benefit of priority from Chinese Patent Application No. 202510120250.7, filed on Jan. 25, 2025. The content of the aforementioned applications, including any intervening amendments thereto, are incorporated herein by reference.

TECHNICAL FIELD

This application relates to dimension identification technologies, and more particularly to a method, device and non-transitory computer-readable medium for identification of plate dimension.

BACKGROUND

Artificial stone plates need to be stored in warehouses after production. In order to facilitate subsequent deep processing of the artificial stone plates, it is needed to obtain size information of the artificial stone plated for registration during entering the warehouses, so that artificial stone plates with corresponding sizes can be quickly selected for processing when they are released from the warehouses.

At present, sizes of the artificial stone plates are usually measured by manual measurement with tape measure. Because of large sizes of the artificial stone plates, time used for manual measurement will be longer, resulting in low storage efficiency of the artificial stone plates.

SUMMARY

In view of the above defects, this application is to provide a plate size identification method, apparatus, device and medium, so as to solve the problems of low storage efficiency of the artificial stone plates caused by long time used for manual measurement on sizes of artificial stone plates.

In order to achieve the above objectives, technical solutions of this application are described as follows.

A method for identification of plate dimension, comprising:

- (S1) establishing a plate dimension identification model through steps of:
  - (S11) under n predetermined shooting distances h, respectively collecting a ratio R of a length of a reference plate to an image pixel length of the reference plate, and respectively collecting a ratio R' of a width of the reference plate to an image pixel width of the reference plate, wherein $n \geq 2$; and
  - (S12) correlating each of the n predetermined shooting distances with a corresponding ratio R and a corresponding ratio R' to establish the plate dimension identification model;
- (S2) measuring a weight M of a target plate;
- (S3) obtaining a mounting distance $H_1$ between a camera and a plate-carrying surface; inputting the mounting distance $H_1$ to the plate dimension identification model to generate a corresponding ratio R and a corresponding ratio R', which are defined as $R_{rough}$ and $R'_{rough}$, respectively;
- (S4) collecting an image of the target plate, and obtaining an image pixel width $w_1$ of the target plate and an image pixel length $l_1$ of the target plate according to the image of the target plate;

calculating a rough width $W_1$ of the target plate according to the image pixel width $w_1$ and the $R'_{rough}$; and calculating a rough length $L_1$ of the target plate according to the image pixel length $l_1$ of the target plate and the $R_{rough}$;

- (S5) calculating a rough thickness $D_1$ of the target plate according to the following formula:

$$D_1=M/(W_1 \times L_1 \times \rho), \text{ wherein } \rho \text{ is a preset density;}$$

- (S6) comparing the rough thickness $D_1$ with a plurality of preset reference thicknesses, and selecting one closest to the rough thickness $D_1$ from the plurality of a preset reference thickness as a final thickness $D_2$ of the target plate;
- (S7) calculating a shooting distance $H_2$ between the camera and the target plate according to the following formula:

$$H_2 = H_1 - D_2;$$

and

- (S8) inputting the shooting distance $H_2$ into the plate dimension identification model to generate a corresponding ratio R and a corresponding ratio R', which are defined as $R_{accurate}$ and $R'_{accurate}$, respectively;

according to the image pixel width $w_1$ of the target plate and the $R'_{accurate}$, calculating an accurate width $W_2$ of the target plate; and according to the image pixel length $l_1$ of the target plate and the $R_{accurate}$, calculating an accurate length $L_2$ of the target plate.

In an embodiment, the step (S11) comprises:

inputting a size of the reference plate to the plate dimension identification model, wherein the size of the reference plate comprises the length of the reference plate and the width of the reference plate, which are defined as $L_{reference}$ and $W_{reference}$, respectively;

at each of the n predetermined shooting distances h, collecting an image of the reference plate, and obtaining the image pixel width of the reference plate and the image pixel length of the reference plate, which are defined as $w_{reference}$ and $l_{reference}$, respectively; and calculating the ratio R and the ratio R' respectively according to the following formula:

$$R = L_{reference}/l_{reference} \text{ and } R' = W_{reference}/w_{reference}.$$

In an embodiment, in step (S4), the rough width $W_1$ of the target plate is calculated according to the following formula:

$$W_1 = w_1 \times R'_{rough};$$

and the rough length $L_1$ of the target plate is calculated according to the following formula:

$$L_1 = l_1 \times R_{rough}.$$

In an embodiment, in step (S8), the accurate width $W_2$ of the target plate is calculated according to the following formula:

$$W_2 = w_1 \times R'_{accurate};$$

and the accurate length $L_2$ of the target plate is calculated according to the following formula:

$$L_2 = l_1 \times R_{accurate}.$$

In an embodiment, step (S4) further comprises: subjecting the image of the target plate to distortion correction.

A device for implementing the above method is provided, comprising:

a camera mechanism;

a plate transferring mechanism;

a weighing mechanism; and a control processor;

wherein the weighing mechanism is provided with the plate-carrying surface, and the plate-carrying surface is configured to receive the target plate; and the weighing mechanism is configured to measure the weight of the target plate;

the plate transferring mechanism is configured to transfer the target plate to the plate-carrying surface;

the camera mechanism is provided on a side of the weighing mechanism, and an image capture of the camera mechanism is configured to face towards the plate-carrying surface; and the camera mechanism is configured to capture the image of the target plate placed on the plate-carrying surface; and the control processor is communicatively connected with the camera mechanism, the plate transferring mechanism and the weighing mechanism, and is configured to perform steps of the above method.

In an embodiment, the control processor comprises a model establishment module, an image processing module, a first calculating module, a comparison module, a distance correction module and a second calculating module;

the model establishment module is configured to:

under the n predetermined shooting distances h, respectively collect the ratio R of the length of the reference plate to the image pixel length of the reference plate, and respectively collect the ratio R' of the width of the reference plate to the image pixel width of the reference plate, wherein $n \geq 2$;

correlate each of the n predetermined shooting distances with a corresponding ratio R and a corresponding ratio R' to establish the plate dimension identification model; and store the preset density ρ;

the image processing module is configured to:

receive the image of the target plate from the camera mechanism and process to obtain the image pixel width $w_1$ of the target plate and the image pixel length $l_1$ of the target plate at the mounting distance $H_1$; and perform distortion correction on the image of the target plate;

the first calculating module is configured to:

input the mounting distance $H_1$ to the plate dimension identification model to generate the corresponding ratio R and a corresponding ratio R', which are defined as $R_{rough}$ and $R'_{rough}$, respectively;

calculate the rough width $W_1$ of the target plate according to the image pixel width $w_1$ of the target plate and the $R'_{rough}$, and calculate the rough length $L_1$ of the target plate according to the image pixel length $l_1$ of the target plate and the $R_{rough}$; and calculate the rough thickness $D_1$ of the target plate according to the preset density ρ and the weight M of the target plate;

the comparison module is configured to compare the rough thickness $D_1$ with the plurality of preset reference thicknesses, and select one closest to the rough thickness $D_1$ from the plurality of preset reference thicknesses as the final thickness $D_2$ of the target plate;

the distance correction module is configured to calculate the shooting distance $H_2$ between the camera and the target plate according to the mounting distance $H_1$ and the final thickness $D_2$; and the second calculating module is configured to:

input the shooting distance $H_2$ into the plate dimension identification model to generate a corresponding ratio R and a corresponding ratio R', which are defined as $R_{accurate}$ and $R'_{accurate}$, respectively;

calculate the accurate width $W_2$ of the target plate according to the image pixel width $w_1$ of the target plate and the $R'_{accurate}$; and calculate the accurate length $L_2$ of the target plate according to the image pixel length $l_1$ of the target plate and the $R_{accurate}$.

In an embodiment, the model establishment module comprises a storage submodule, a calculating submodule and a correlation submodule;

the storage submodule is configured to store the size of the plate comprising the width $W_{reference}$ and the length $L_{reference}$ of the reference plate, and store the preset density ρ;

the calculating submodule is configured to calculate the ratio R and the ratio R' under each of the n predetermined shooting distances h respectively according to the following formulas:

$$R = L_{reference}/l_{reference} \text{ and } R' = W_{reference}/w_{reference};$$

and the correlation submodule is configured to correlate each of the n predetermined shooting distance h with the corresponding ratio R and the corresponding ratio R'.

An electronic device is provided, comprising:

a memory;

a processor; and a computer program;

wherein the computer program is stored in the memory, and is configured to be executed in the processor; the processor is configured to execute the computer program to implement the above method.

A non-transitory computer-readable storage medium is provided, wherein the computer program is stored in the non-transitory computer-readable storage medium, and is configured to be executed by a processor to implement the above method.

The present disclosure has the following beneficial effects.

The present disclosure can automatically correct the shooting distance between the surface of the plate being photographed and the camera through combining weighing technology and photogrammetric measurement technology, so as to calculate the size of the plate according to a corrected shooting distance and image pixel ratios, which has higher accuracy. The present disclosure can also automatically measure the size information of the plate without manual participation, so as to improve the storage efficiency of the plate.

Figure 1:
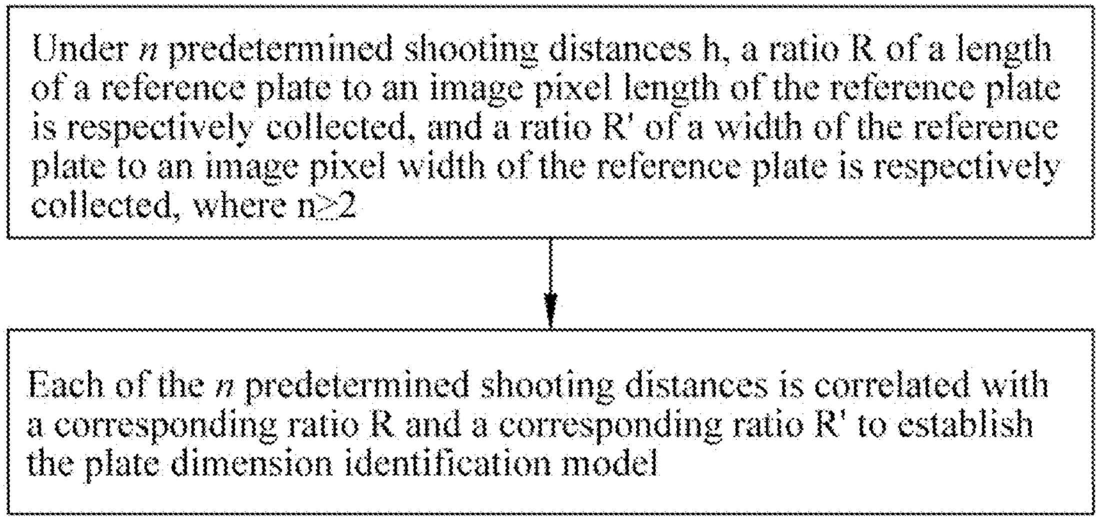
FIG. 1 is a flow diagram of steps of initializing settings according to an embodiment of the present disclosure.

In Figures: 1, camera mechanism; 2, plate transferring mechanism; and 3, weighing mechanism.

DETAILED DESCRIPTION OF EMBODIMENTS

The embodiments of the present disclosure are described in detail below. The embodiments are illustrated in the accompanying drawings, where identical or similar reference numerals indicate identical or similar elements or elements having identical or similar functions. The embodiments described in detail below with reference to the accompanying drawings are only exemplary and illustrative, and are not intended to limit the disclosure.

In the disclosure, it should be understood that the terms, such as “longitudinal”, “transverse”, “up”, “down”, “front”, “rear”, “left”, “right”, “vertical”, “horizontal”, “top”, “bottom”, “inner”, “outer”, and other directional indications used herein, are only used for illustrating relative position relationship and motion between components in a specific state (as shown in the accompanying drawings), rather than limiting the disclosure. In addition, a feature defined with “first” or “second” may explicitly or implicitly indicates the inclusion of at least one of such features without implying order and importance.

As used herein, unless otherwise expressly specified and limited, the terms “connection”, “linkage” and “fixing” should be interpreted in a broad sense. For example, it can be “fixed connection”, “removable connection” or “integral connection”; it can be “mechanical connection” or “electrical connection”; it can be “direct connection” or “indirect connection through an intermediate medium”; and it can be internal communication or interaction between two components. For those of ordinary skill in the art, the specific meaning of these terms can be understood in specific cases.

The technical solutions of this application are further described in combination of FIGS. 1-5 and the embodiments.

Referring to FIGS. 1-5, a method for identification of plate dimension includes the following steps.

(S1) A plate dimension identification model is established through the following steps.

(S11) Under n predetermined shooting distances h, a ratio R of a length of a reference plate to an image pixel length of the reference plate is respectively collected, and a ratio R' of a width of the reference plate to an image pixel width of the reference plate is respectively collected, where $n \geq 2$.

(S12) Each of the n predetermined shooting distances is correlated with a corresponding ratio R and a corresponding ratio R' to establish the plate dimension identification model.

(S2) A weight M of a target plate is measured.

(S3) A mounting distance $H_1$ between a camera and a plate-carrying surface is obtained. The mounting distance $H_1$ is input to the plate dimension identification model to generate a corresponding ratio R and a corresponding ratio R', which are defined as $R_{rough}$ and $R'_{rough}$, respectively.

(S4) An image of the target plate is collected, and an image pixel width $w_1$ of the target plate and an image pixel length $l_1$ of the target plate are obtained according to the image of the target plate are obtained. According to the image pixel width $w_1$ of the target plate and the $R'_{rough}$, a rough width $W_1$ of the target plate is calculated. According to the image pixel length $l_1$ of the target plate and the $R_{rough}$, a rough length $L_1$ of the target plate is calculated.

(S5) A rough thickness $D_1$ of the target plate is calculated according to the following formula:

$D_1 = M/(W_1 \times L_1 \times \rho)$, wherein ρ is a preset density.

(S6) The rough thickness $D_1$ is compared with a plurality of preset reference thicknesses, and one closest to the rough thickness $D_1$ is selected from the plurality of preset reference thicknesses as a final thickness $D_2$ of the target plate.

(S7) A shooting distance $H_2$ between the camera and the target plate is calculated according to the following formula:

$$H_2 = H_1 - D_2.$$

(S8) The shooting distance $H_2$ is input to the plate dimension identification model to generate a corresponding ratio R and a corresponding ratio R', which are defined as $R_{accurate}$ and $R'_{accurate}$, respectively. According to the image pixel width $w_1$ of the target plate and the $R'_{accurate}$, an accurate width $W_2$ of the target plate is calculated. According to the image pixel length $l_1$ of the target plate and the $R_{accurate}$, an accurate length $L_2$ of the target plate is calculated.

The present disclosure calculates the rough length $L_1$ of the target plate and the rough width $W_1$ of the target plate according to the $R_{rough}$ and the width ratio $R'_{rough}$ at the mounting distance $H_1$. Then, the rough thickness $D_1$ is calculated according to the preset density ρ, and is compared with the plurality of preset reference thicknesses to obtain the final thickness $D_2$. According to the final thickness $D_2$, the shooting distance $H_2$ between the camera and the target plate is calculated. Finally, according to the length ratio R and the width ratio R' at the shooting distance $H_2$, the accurate length $L_2$ of the target plate and the accurate width $W_2$ of the target plate are calculated, so that a measured dimension of the target plate is more accurate. The present disclosure can calculate a dimension information of an artificial stone plate through combining weighing and photographing, and can automatically calculate an accurate dimension information of the plate without manual participation, which has high efficiency and improves storage efficiency of the plate.

It should be noted that the mounting distance $H_1$ is a distance between the camera and the plate-carrying surface, and the camera is provided directly facing towards the plate-carrying surface. When the target plate is placed on the plate-carrying surface, the image of the target plate captured by the camera is a side of the target plate facing towards the camera, therefore, the final thickness $D_2$ needs to be calculated, and according to the final thickness $D_2$, the shooting distance $H_2$ between the camera and the side of the target plate facing towards the camera. In this way, according to the R and the R' at the shooting distance $H_2$, the accurate length $L_2$ of the target plate and the accurate width $W_2$ of the target plate are calculated.

Figure 2:
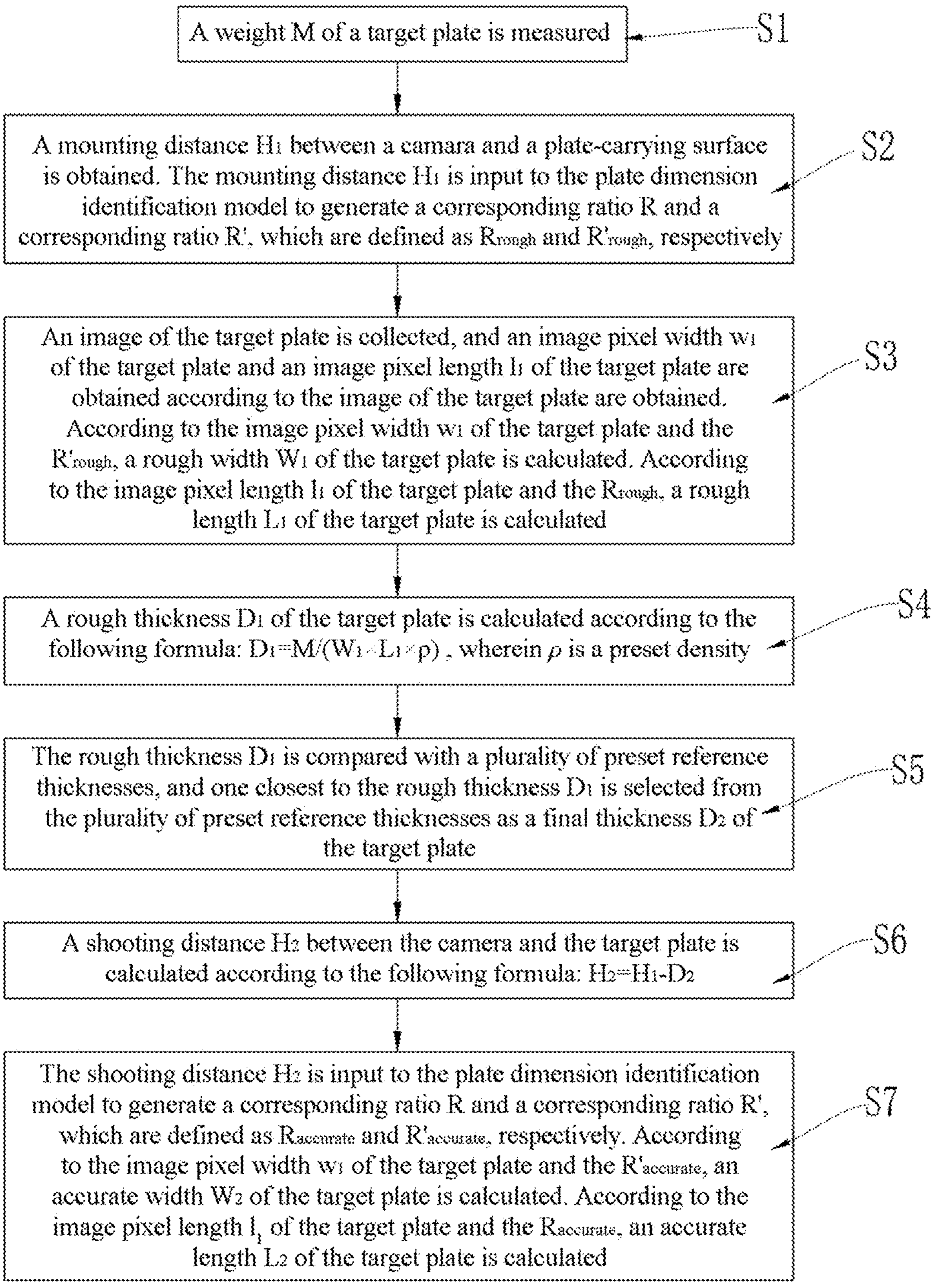
FIG. 2 is a flow diagram of steps of identifying according to an embodiment of the present disclosure.
Figure 3:
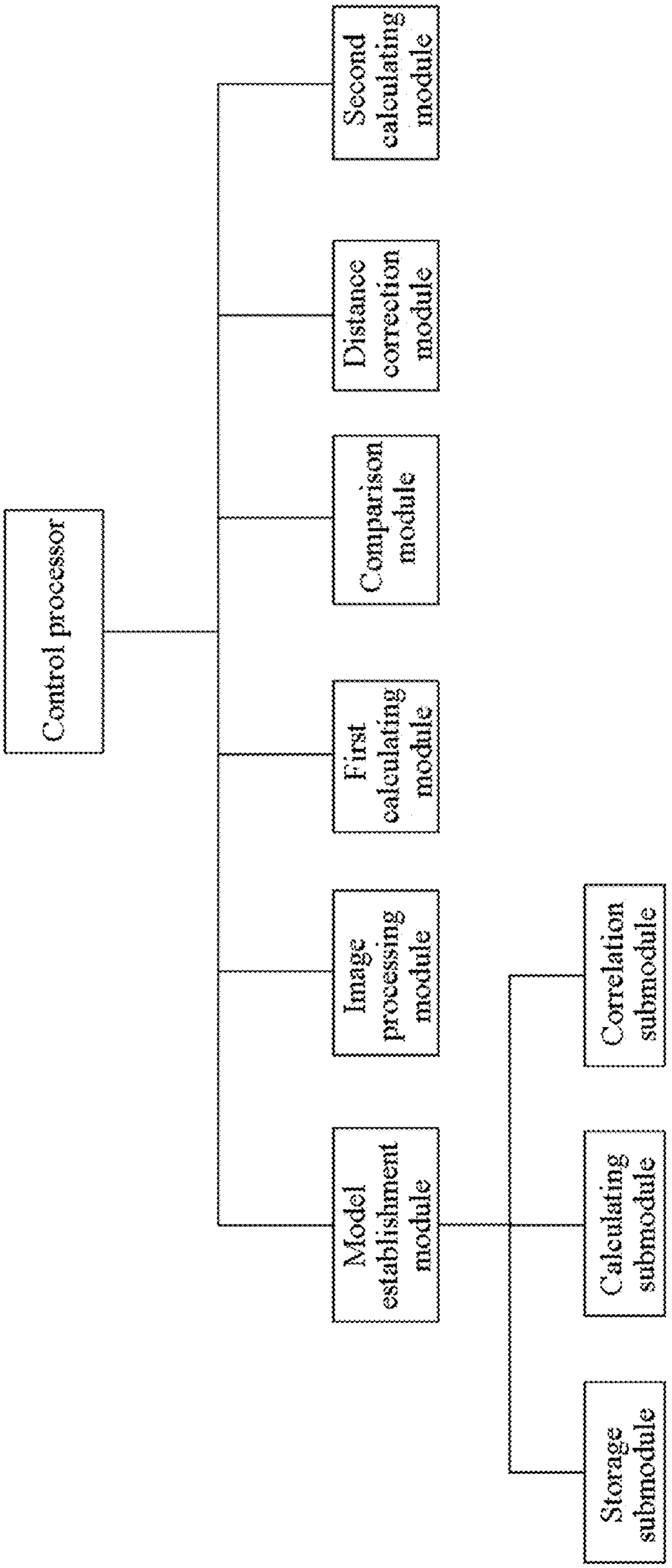
FIG. 3 is a structural diagram of a control processor according to an embodiment of the present disclosure.

Referring to FIGS. 1-3, step (S11) includes the following steps.

A size of the reference plate is input to the plate dimension identification model, where the size of the reference plate includes the length of the reference plate and the width of the reference plate, which are defined as $L_{reference}$ and $W_{reference}$, respectively.

An image of the reference plate at each of the n predetermined shooting distances h is collected, and the image pixel width of the reference plate and the image pixel length of the reference plate is obtained, which defined as $w_{reference}$ and $l_{reference}$, respectively.

The ratio R and the ratio R' are calculated respectively according to the following formulas:

$$R = L_{reference}/l_{reference} \text{ and } R' = W_{reference}/w_{reference}.$$

In an embodiment, the reference plate at each of the n predetermined shooting distances h is captured to obtain the image of the reference plate. According to the image of the reference plate at each of the n predetermined shooting distances h, the $w_{reference}$ and the $l_{reference}$ are obtained, so that the ratio R and the ratio R' at each of the n predetermined shooting distances h are calculated.

In should be noted that a unit of the $W_{reference}$ is meter, a unit of the $L_{reference}$ is meter, a unit of the ratio R is meter/pixel, and a unit of the ratio R' is meter/pixel.

Referring to FIGS. 1-3, in step (S4), the rough width $W_1$ of the target plate is calculated according to the following formula:

$$W_1 = w_1 \times R'_{rough};$$

and the rough length $L_1$ of the target plate is calculated according to the following formula:

$$L_1 = l_1 \times R_{rough}.$$

Referring to FIGS. 1-3, in step (S8), the accurate width $W_2$ of the target plate is calculated according to the following formula:

$$W_2 = w_1 \times R'_{accurate};$$

and the accurate length $L_2$ of the target plate is calculated according to the following formula:

$$L_2 = l_1 \times R_{accurate}.$$

Referring to FIGS. 1-3, the image of the target plate collected in step (S4) is subjected to distortion correction.

In an embodiment, in order to avoid a distortion caused by a lens of the camera and an impact of the plate tilted at the plate-carrying surface on imaging effect, the captured image of the target plate is subjected to pre-treatment, such as the distortion correction, so as to obtain more accurate image pixel widths and image pixel lengths of the plate, which improve accuracy of measured size of the plate.

Figure 4:
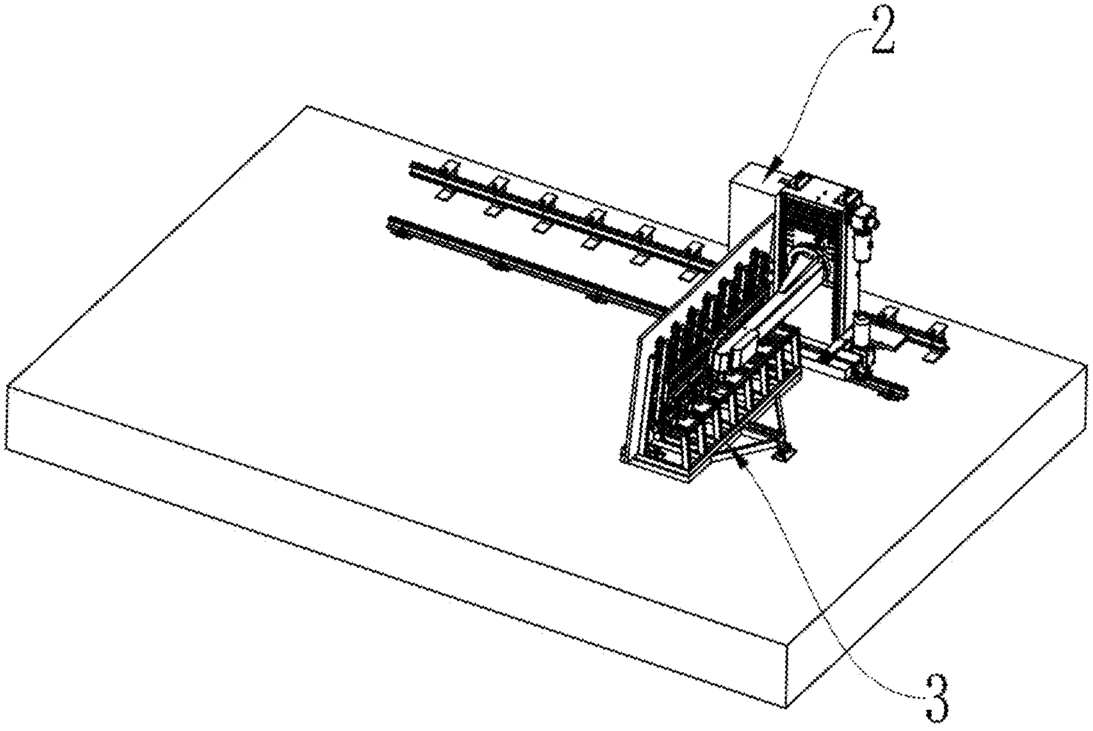
FIG. 4 is a structural diagram of a plate transferring mechanism and a weighing mechanism according to an embodiment of the present disclosure.
Figure 5:
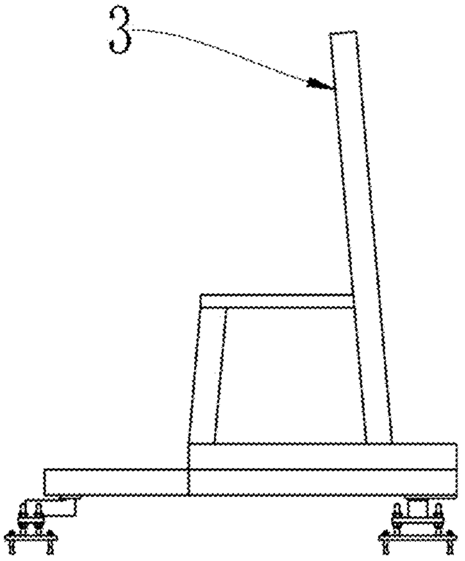
FIG. 5 is a structural diagram of a camera mechanism and the weighing mechanism according to an embodiment of the present disclosure.
Figure 5:
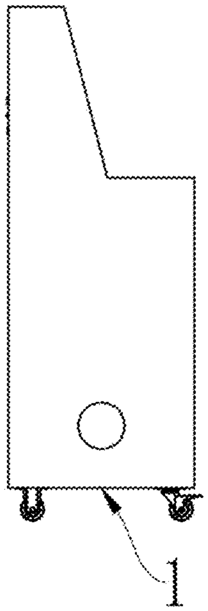

Referring to FIGS. 4-5, a device for implementing the above method is provided, including a camera mechanism 1, a plate transferring mechanism 2, a weighing mechanism 3 and a control processor.

The weighing mechanism 3 is provided with the plate-carrying surface, and the plate-carrying surface is configured to receive the target plate. The weighing mechanism 3 is configured to measure the weight of the target plate.

The plate transferring mechanism 2 is configured to transfer the target plate to the plate-carrying surface of the weighing mechanism 3.

The camera mechanism 1 is provided on a side of the weighing mechanism 3, and an image capture of the camera mechanism 1 is configured to face towards the plate-carrying surface. The camera mechanism is configured to capture the image of the target plate placed on the plate-carrying surface.

The control processor is communicatively connected with the camera mechanism 1, the plate transferring mechanism 2 and the weighing mechanism 3, and is configured to perform steps of the above method.

It can be understood that the target plate is placed on the plate-carrying surface of the weighing mechanism 3 through the plate transferring mechanism 2, and is photographed through the camera mechanism 1 to obtain the image of the target plate. Then the size of the target plate is calculated through the control processor without manual participation. In this way, size measurement of the target plate can be automatically completed, which improves measurement efficiency of the target plate.

In an embodiment, the control processor includes a model establishment module, an image processing module, a first calculating module, a comparison module, a distance correction module and a second calculating module.

The model establishment module is configured to:

under the n predetermined shooting distances h, respectively collect the ratio R of the length of the reference plate to the image pixel length of the reference plate, and respectively collect the ratio R' of the width of the reference plate to the image pixel width of the reference plate, wherein $n \geq 2$;

correlate each of the n predetermined shooting distances with a corresponding ratio R and a corresponding ratio R' to establish the plate dimension identification model; and store the preset density ρ.

The image processing module is configured to:

receive the image of the target plate from the camera mechanism and process to obtain the image pixel width $w_1$ of the target plate and the image pixel length $l_1$ of the target plate at the mounting distance $H_1$; and perform distortion correction on the image of the target plate.

The first calculating module is configured to:

input the mounting distance $H_1$ to the plate dimension identification model to generate the corresponding ratio R and a corresponding ratio R', which are defined as $R_{rough}$ and $R'_{rough}$, respectively;

calculate the rough width $W_1$ of the target plate according to the image pixel width $w_1$ of the target plate and the $R'_{rough}$, and calculate the rough length $L_1$ of the target plate according to the image pixel length $l_1$ of the target plate and the $R_{rough}$; and calculate the rough thickness $D_1$ of the target plate according to the preset density ρ and the weight M of the target plate.

The comparison module is configured to compare the rough thickness $D_1$ with the plurality of preset reference thicknesses, and select one closest to the rough thickness $D_1$ from the plurality of preset reference thicknesses as the final thickness $D_2$ of the target plate.

The distance correction module is configured to calculate the shooting distance $H_2$ between the camera and the target plate according to the mounting distance $H_1$ and the final thickness $D_2$.

The second calculating module is configured to:

input the shooting distance $H_2$ into the plate dimension identification model to generate a corresponding ratio R and a corresponding ratio R', which are defined as $R_{accurate}$ and $R'_{accurate}$, respectively;

calculate the accurate width $W_2$ of the target plate according to the image pixel width $w_1$ of the target plate and the $R'_{accurate}$; and calculate the accurate length $L_2$ of the target plate according to the image pixel length $l_1$ of the target plate and the $R_{accurate}$.

It should be noted that the model establishment module is configured to respectively collect the ratio R of the length of the reference plate to the image pixel length of the reference plate, and respectively collect the ratio R' of the width of the reference plate to the image pixel width of the reference plate under the n predetermined shooting distances h, and correlate each of the n predetermined shooting distances with a corresponding ratio R and a corresponding ratio R' to establish the plate dimension identification model, so that when the shooting distance $H_2$ is obtained, the ratio R and the ratio R' at the shooting distance $H_2$ can be quickly obtained.

Referring FIG. 3, the model establishment module includes a storage submodule, a calculating submodule and a correlation submodule.

The storage submodule is configured to store the size of the plate including the width $W_{reference}$ and the length $L_{reference}$ of the reference plate, and store the preset density ρ.

The calculating submodule is configured to calculate the ratio R and the ratio R' under each of the n predetermined shooting distances h respectively according to the following formulas:

$$R = L_{reference}/l_{reference} \text{ and } R' = W_{reference}/w_{reference}.$$

The correlation submodule is configured to correlate each of the n predetermined shooting distance h with the corresponding ratio R and the corresponding ratio R'.

In order to solve technical problems above, the present disclosure also provides an electronic device, including a memory, a processor, and a computer program. The computer program is stored in the memory, and is configured to be executed in the processor. The processor is configured to execute the computer program to implement the above method.

In order to solve technical problems above, the present disclosure also provides a non-transitory computer-readable storage medium. The computer program is stored in the non-transitory computer-readable storage medium, and is configured to be executed by a processor to implement the above method.

Described above are technical principle in combination of specific embodiments of the present disclosure, which are only illustrative rather than limiting the disclosure. It should be noted that other embodiments thought by those of ordinary skill in the art without creative labor shall fall within the scope of this application defined by the appended claims.

What is claimed is:

1. A method for identification of plate dimension, comprising:

(S1) establishing a plate dimension identification model through steps of:

(S11) under n predetermined shooting distances h, respectively collecting a ratio R of a length of a reference plate to an image pixel length of the reference plate, and respectively collecting a ratio R' of a width of the reference plate to an image pixel width of the reference plate, wherein n≥2; and (S12) correlating each of the n predetermined shooting distances with a corresponding ratio R and a corresponding ratio R' to establish the plate dimension identification model;

(S2) measuring a weight M of a target plate;

(S3) obtaining a mounting distance $H_1$ between a camera and a plate-carrying surface; inputting the mounting distance $H_1$ to the plate dimension identification model to generate a corresponding ratio R and a corresponding ratio R', which are defined as $R_{rough}$ and $R'_{rough}$, respectively;

(S4) collecting an image of the target plate, and obtaining an image pixel width $w_1$ of the target plate and an image pixel length $l_1$ of the target plate according to the image of the target plate;

calculating a rough width $W_1$ of the target plate according to the image pixel width $w_1$ and the $R'_{rough}$; and calculating a rough length $L_1$ of the target plate according to the image pixel length $l_1$ of the target plate and the $R_{rough}$;

(S5) calculating a rough thickness $D_1$ of the target plate according to the following formula:

$$D_1 = M/(W_1 \times L_1 \times \rho), \text{ wherein } \rho \text{ is a preset density;}$$

(S6) comparing the rough thickness $D_1$ with a plurality of preset reference thicknesses, and selecting one closest to the rough thickness $D_1$ from the plurality of preset reference thicknesses as a final thickness $D_2$ of the target plate;

(S7) calculating a shooting distance $H_2$ between the camera and the target plate according to the following formula:

$$H_2 = H_1 - D_2;$$

(S8) inputting the shooting distance $H_2$ into the plate dimension identification model to generate a corresponding ratio R and a corresponding ratio R', which are defined as $R_{accurate}$ and $R'_{accurate}$, respectively;

according to the image pixel width $w_1$ of the target plate and the $R'_{accurate}$, calculating an accurate width $W_2$ of the target plate; and according to the image pixel length $l_1$ of the target plate and the $R_{accurate}$, calculating an accurate length $L_2$ of the target plate.

2. The method of claim 1, wherein step (S11) comprises:

inputting a size of the reference plate to the plate dimension identification model, wherein the size of the reference plate comprises the length of the reference plate and the width of the reference plate, which are defined as $L_{reference}$ and $W_{reference}$, respectively;

at each of the n predetermined shooting distances h, collecting an image of the reference plate, and obtaining the image pixel width of the reference plate and the image pixel length of the reference plate, which are defined as $w_{reference}$ and $l_{reference}$, respectively; and calculating the ratio R and the ratio R' respectively according to the following formulas:

$$R = L_{reference}/l_{reference} \text{ and } R' = W_{reference}/w_{reference}.$$

3. The method of claim 1, wherein in step (S4), the rough width $W_1$ of the target plate is calculated according to the following formula:

$$W_1 = w_1 \times R'_{rough};$$

and the rough length $L_1$ of the target plate is calculated according to the following formula:

$$L_1 = l_1 \times R_{rough}.$$

4. The method of claim 1, wherein in step (S8), the accurate width $W_2$ of the target plate is calculated according to the following formula:

$$W_2 = w_1 \times R'_{accurate};$$

and the accurate length $L_2$ of the target plate is calculated according to the following formula:

$$L_2 = l_1 \times R_{accurate}.$$

5. The method of claim 1, wherein step (S4) further comprises:

subjecting the image of the target plate to distortion correction.

6. A device for implementing the method of claim 1, comprising:

a camera mechanism;

a plate transferring mechanism;

a weighing mechanism; and a control processor;

wherein the weighing mechanism is provided with the plate-carrying surface, and the plate-carrying surface is configured to receive the target plate; and the weighing mechanism is configured to measure the weight of the target plate;

the plate transferring mechanism is configured to transfer the target plate to the plate-carrying surface;

the camera mechanism is provided on a side of the weighing mechanism, and an image capture end of the camera mechanism is configured to face towards the plate-carrying surface; and the camera mechanism is configured to capture the image of the target plate placed on the plate-carrying surface; and the control processor is communicatively connected with the camera mechanism, the plate transferring mechanism and the weighing mechanism, and is configured to perform steps of the method for identification of plate dimension.

7. The device of claim 6, wherein the control processor comprises a model establishment module, an image processing module, a first calculating module, a comparison module, a distance correction module and a second calculating module;

the model establishment module is configured to:

under the n predetermined shooting distances h, respectively collect the ratio R of the length of the reference plate to the image pixel length of the reference plate, and respectively collect the ratio R' of the width of the reference plate to the image pixel width of the reference plate, wherein $n \geq 2$;

correlate each of the n predetermined shooting distances with a corresponding ratio R and a corresponding ratio R' to establish the plate dimension identification model; and store the preset density $\rho$;

the image processing module is configured to:

receive the image of the target plate from the camera mechanism and process to obtain the image pixel width $w_1$ of the target plate and the image pixel length $l_1$ of the target plate at the mounting distance $H_1$;

perform distortion correction on the image of the target plate;

the first calculating module is configured to:

input the mounting distance $H_1$ to the plate dimension identification model to generate the corresponding ratio R and a corresponding ratio R', which are defined as $R_{rough}$ and $R'_{rough}$, respectively;

calculate the rough width $W_1$ of the target plate according to the image pixel width $w_1$ of the target plate and the $R'_{rough}$, and calculate the rough length $L_1$ of the target plate according to the image pixel length $l_1$ of the target plate and the $R_{rough}$; and calculate the rough thickness $D_1$ of the target plate according to the preset density ρ and the weight M of the target plate;

the comparison module is configured to compare the rough thickness $D_1$ with the plurality of preset reference thicknesses, and select one closest to the rough thickness $D_1$ from the plurality of preset reference thicknesses as the final thickness $D_2$ of the target plate;

the distance correction module is configured to calculate the shooting distance $H_2$ between the camera and the target plate according to the mounting distance $H_1$ and the final thickness $D_2$; and the second calculating module is configured to:

input the shooting distance $H_2$ into the plate dimension identification model to generate a corresponding ratio R and a corresponding ratio R', which are defined as $R_{accurate}$ and $R'_{accurate}$, respectively;

calculate the accurate width $W_2$ of the target plate according to the image pixel width $w_1$ of the target plate and the $R'_{accurate}$; and calculate the accurate length $L_2$ of the target plate according to the image pixel length $l_1$ of the target plate and the $R_{accurate}$.

8. The device of claim 7, wherein the model establishment module comprises a storage submodule, a calculating submodule and a correlation submodule;

the storage submodule is configured to store the size of the plate comprising the width $W_{reference}$ and the length $L_{reference}$ of the reference plate, and store the preset density ρ;

the calculating submodule is configured to calculate the ratio R and the ratio R' under each of the n predetermined shooting distances h respectively according to the following formulas:

$$R = L_{reference}/l_{reference} \text{ and } R' = W_{reference}/w_{reference};$$

and the correlation submodule is configured to correlate each of the n predetermined shooting distance h with the corresponding ratio R and the corresponding ratio R'.

9. An electronic device, comprising:

a memory;

a processor; and a computer program;

wherein the computer program is stored in the memory, and is configured to be executed in the processor; and the processor is configured to execute the computer program to implement the method of claim 1.

10. A non-transitory computer-readable storage medium, wherein a computer program is stored in the non-transitory computer-readable storage medium, and is configured to be executed by a processor to implement the method of claim 1.

* * * * *